United States Patent [19]
Tsuyuguchi et al.

[11] Patent Number: 5,862,113
[45] Date of Patent: Jan. 19, 1999

[54] METHOD AND APPARATUS FOR WOBBLE-FREE DATA RECOVERY FROM CD-ROM OR THE LIKE

[75] Inventors: Hiroshi Tsuyuguchi, Tokyo; Mitsumasa Kubo, Tachikawa, both of Japan

[73] Assignee: Teac Corporation, Tokyo, Japan

[21] Appl. No.: 876,561

[22] Filed: Jun. 16, 1997

[30] Foreign Application Priority Data

Jun. 21, 1996 [JP] Japan .................................. 8181326
Oct. 25, 1996 [JP] Japan .................................. 8300990

[51] Int. Cl.$^6$ ........................................ G11B 7/00
[52] U.S. Cl. .................................................. 369/50
[58] Field of Search ........................ 369/50, 48, 56, 369/47, 32, 54; 360/73.03, 69

[56] References Cited

U.S. PATENT DOCUMENTS

| | | | |
|---|---|---|---|
| 5,617,392 | 4/1997 | Shim | 369/50 |
| 5,764,610 | 1/1997 | Yoshida et al. | 369/50 |
| 5,768,231 | 1/1996 | Sagata | 369/50 |

*Primary Examiner*—Nabil Hindi
*Attorney, Agent, or Firm*—Woodcock Washburn Kurtz MacKiewicz & Norris LLP

[57] ABSTRACT

A CD-ROM drive is disclosed which usually is put to use with CR-ROMs of varying qualities which may, or may not, wobble during rotation, possibly resulting in the vibration of the complete device. On being loaded into the device, therefore, each disk is rotated at increasing speed preparatory to reading. The speed of disk rotation at which vibration due to disk wobbling builds up to a prescribed limit is held as a maximum allowable speed until the disk is unloaded. The disk is subsequently read at no more than the maximum allowable speed.

18 Claims, 11 Drawing Sheets

METHOD AND APPARATUS FOR WOBBLE-FREE DATA RECOVERY FROM CD-ROM OR THE LIKE

BACKGROUND OF THE INVENTION

This invention relates to the recovery of data from rotating data storage disks such as, typically, compact disks (CDs) used as read-only memories (ROMs) in computer systems. More specifically, the invention concerns how to preclude the possible wobbling of CD-ROMs or the like for error-free reading thereof.

Although originally developed for consumer audio reproduction, CDs have now found widespread acceptance as compact, high-speed, large-capacity ROMs for computers. CD-ROMs are driven at linear velocities several times as high as the standard linear velocities (1.2–1.4 meters per second) of audio CDs.

There has been a problem left unsolved in use of CD-ROMs in high-speed CD-ROM drives in computers. CD-ROMs are made under the same design specifications and manufacturing standards as low-speed audio CDs. Inevitably, therefore, there are some CD-ROMs on the market that are not of satisfactory quality for use as high-speed computer data storage media, including those having their center holes cut eccentrically, and those having an uneven weight distribution circumferentially. Such low-grade disks are easy to wobble when driven at a speed as high as, say, 12 times the standard audio CD speed: The disk wobbling may go so far as to make tracking and focus controls difficult or even impossible. Improper functioning of the tracking and focus controls will result in read errors, which necessitate retries and thus impede high speed data recovery.

The wobbling of low grade disks can give rise to additional inconveniences. A wobbling disk may cause vibration of the complete CD-ROM drive, giving the user a shoddy image. Worse yet, the complete computer may vibrate with the CD-ROM drive. Particularly undesirable is the vibration of a hard-disk drive (HDD) that may be incorporated with the computer along with the CD-ROM drive. The vibration of the HDD can readily lead to read and write errors, to the detriment of the reliability of the computer.

All such troubles and inconveniences might be avoided if only high quality CD-ROMs, altogether free from the physical defects pointed out earlier, were used. CD-ROM drive manufacturers cannot, and should not, expect their products to be used only that way.

SUMMARY OF THE INVENTION

The present invention has it as an object to enable data recovery from rotating data storage disks of low grade without any such troubles and inconveniences as have been encountered heretofore.

Another object of the invention is to drive data storage disks of varying qualities at a speed suiting each disk in order to keep it from wobbling so much as to cause the noted troubles or inconveniences.

A further object of the invention is to drive each data storage disk at a maximum possible speed that has been predetermined according to the degree of its wobbling, and hence to minimize loss in the speed of data recovery.

Briefly stated in one aspect thereof, the invention concerns a method of data recovery from rotating data storage disks of varying physical qualities which may, or may not, wobble during rotation. A data storage disk is first rotated at increasing speed preparatory to data recovery therefrom, and the possible wobbling of the rotating disk is sensed to see if the wobbling of the disk builds up to a predetermined limit. If it does, the rotational speed of the disk at that time is held as a maximum allowable speed for the disk. If it does not even when the disk is rotated at a maximum possible speed for data recovery, then that maximum possible speed is held as a maximum allowable speed for the disk. In subsequent data recovery the disk is rotated at no more than the maximum allowable speed that has been determined as above.

Preferably, the degree of wobbling of the disk being driven at increasing speed is compared with several different predetermined limits at several predetermined disk speeds, since the degree of disk wobbling differs according to how fast it is rotated. When the degree of disk wobbling comes up to one of the predetermined limits at one of the predetermined speeds, the disk speed at that moment is held as the maximum allowable speed for that particular disk. The disk is therefore not to wobble beyond the predetermined limit while being subsequently driven at no more than the maximum allowable speed for reading.

It might be feared that disk wobbling was averted at the sacrifice of disk speed since lower grade disks were of necessity driven at speeds less than good disks were. Such fears are unjustified. Experiment has proved that the error-less reading of low grade disks at reduced speeds demands far less periods of time than high speed reading of such disks which necessarily involves read errors and retries. The advantages of such controlled speed data recovery will be even better appreciated by taking into consideration all the aforementioned difficulties accruing from disk wobbling, which is effectively precluded according to the present invention.

The invention also concerns an apparatus for use in the practice of the inventive method summarized above. The method requires mostly only preexisting parts of an apparatus for reading a CD-ROM or like data storage disk, except perhaps wobbling sensor means for sensing the possible wobbling of each loaded disk, and a system controller in the form of a programmable microprocessor.

The wobbling sensor means may comprise a vibration sensor for sensing disk wobbling in terms of the mechanical vibration of a selected part of the apparatus. Alternatively, in the application of the invention to a CD-ROM drive, the vibration sensor may be mounted to an HDD which is incorporated with a computer along with the CD-ROM drive. Customarily, HDDs have been so constructed as to stop reading or writing when they receive vibrations or shocks. Vibration sensors that have been built into HDDs toward this end may be utilized for the purposes of this invention, too.

It is also possible to sense disk wobbling electrically. Optical disk drives in general have a transducer including a focus control actuator for keeping the beam of light focused on the disk, and a tracking control actuator for keeping the beam spot on the disk in centerline alignment with a track thereon. Both focus control and tracking control actuators have each a moving coil movable in the field of a permanent magnet. Since both focus and tracking controls need not operate during wobble check operation, disk wobbling is detected from a voltage induced in the coil of either actuator as a result of its displacement relative to the permanent magnet. Such electrical sensing of disk wobbling, making use of a preexisting moving coil actuator as sensor, is cheaper than other methods of wobble sensing.

The above and other objects, features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

Figure 1:
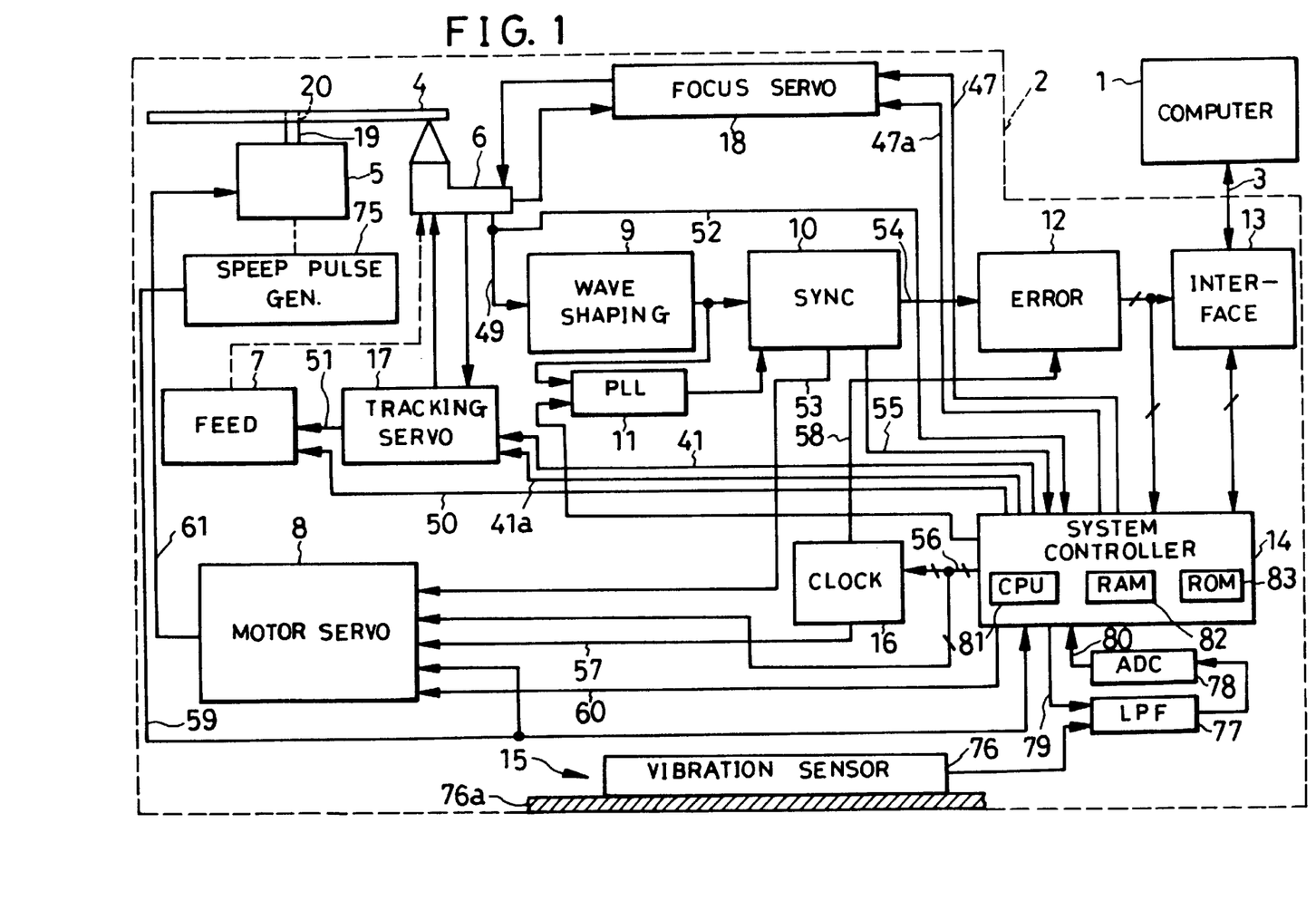
FIG. 1 is a block diagram of an example of CD-ROM drive constructed in accordance with the novel concepts of this invention, the CD-ROM drive being shown together with a computer with which it is incorporated.

The present invention is believed to be best embodied in the computer system diagramed in FIG. 1, which shows a host computer 1 connected to a CD-ROM drive 2 by way of a bus 3. The CD-ROM drive 2 is shown loaded with a CD-ROM or optical data storage disk (hereinafter referred to simply as the disk) 4, which is disposed in position by receiving in its center hole 20 a drive spindle 19 shown as an armature shaft of an electric drive motor 5.

Figure 2:
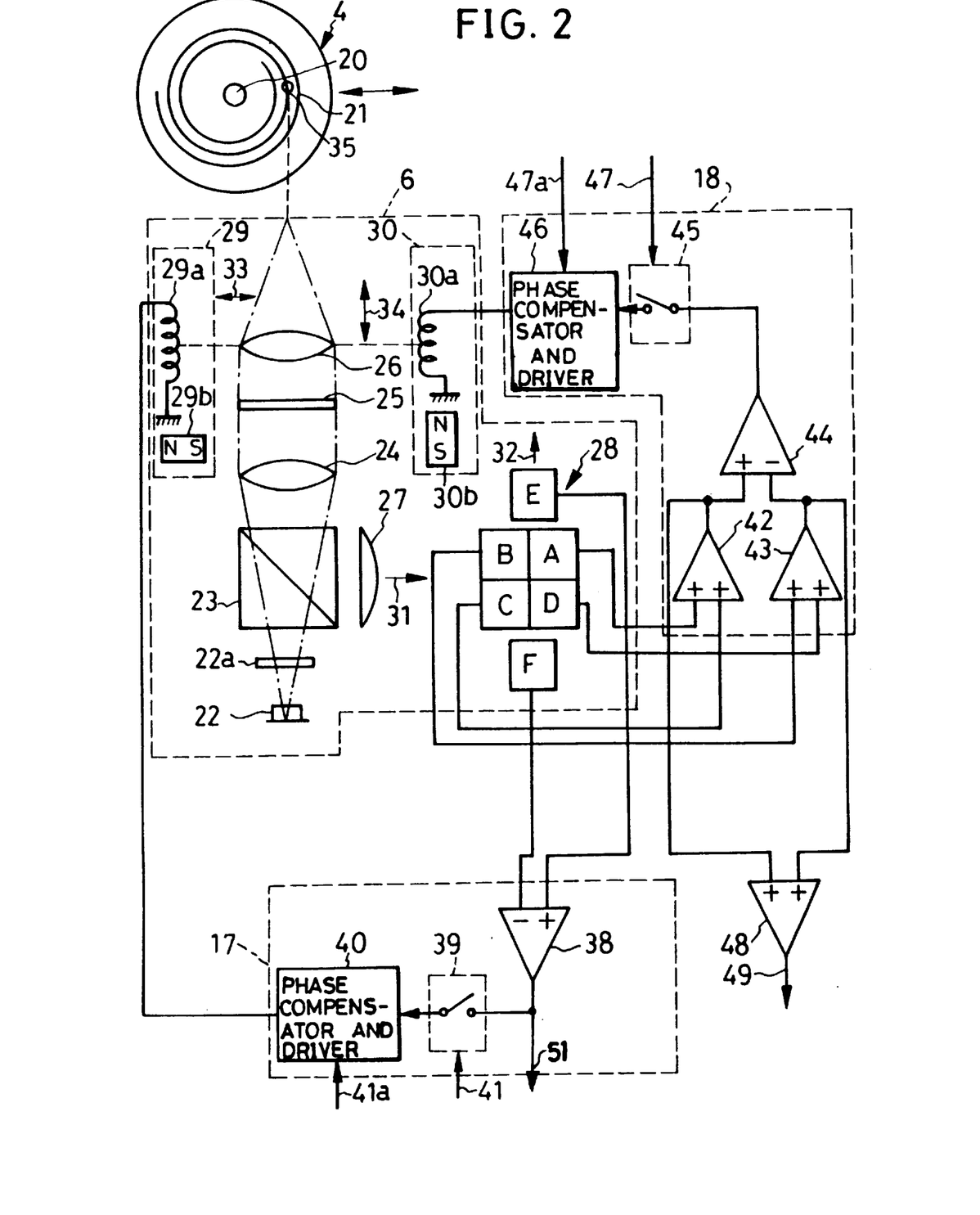
FIG. 2 is a schematic electrical diagram showing in more detail the transducer, tracking servo circuit, and focus servo circuit of the FIG. 1 CD-ROM drive.

As depicted diagrammatically in FIG. 2, the disk 4 can be of the standard CD-ROM design having data prerecorded thereon in the form of optical pits along a multiturn spiral track 21 centered about the hole 20. The data is divided into a multiplicity of blocks each consisting of 2352 bytes, one byte being eight bits. Each data block is read in 1/75 second when the disk is read at a standard speed. In CD-ROMs, as in audio CDs, data is recorded, and read, at constant linear velocity (CLV), rather than at constant angular velocity (CAV), so that the angular velocity of the disk 4 is increased as the disk track 21 is scanned radially inwardly by an optoelectric transducer or pickup 6.

As shown in detail also in FIG. 2, the transducer 6 is of prior art design having a light source such as a diode laser 22, a diffraction grating 22a, a beam splitter 23, a collimator lens 24 for providing parallel rays of light, a quarter wavelength plate 25, an objective lens 26, a semicylindrical lens 27 disposed on the path of the light that has been reflected back from the disk 4 and subsequently separated from the incident light by the beam splitter 23, a photodetector 28, a tracking control actuator 29, and a focus control actuator 30.

Converged by the objective 26, the light from the laser 22 hits the surface of the disk 4. It is understood that in the illustrated transducer 6, the diffraction grating 22a creates a primary beam, used for both reading and focus control, and two auxiliary beams for tracking control, although FIG. 2 shows only the primary beam spot on the disk 4 at 35. The unmodulated primary beam on hitting the disk surface will be modulated by the pattern of optical pits representative of data, and this modulated primary beam, as well as the reflected auxiliary beams, will be directed by the beam splitter 23 into the photodetector 28 via the semicylindrical lens 27.

Capable of translating the incident light into electric signals, the photodetector 28 has a closely packed group of four sections designated A, B, C and D, both for data recovery and for focus control, and two other separate sections E and F for tracking control. The photodetector sections A and B, as well as the sections C and D, are divided along a line extending essentially in the tangential direction of the disk track 21, as indicated by the arrow 32. The other two photodetector sections E and F are aligned in the direction of the arrow 32.

For maintaining the read beam spot 35 in centerline alignment with the disk track 21, the tracking control actuator 29 takes the form of a familiar voice coil actuator comprising a moving coil 29a coupled to the objective 26, and a permanent magnet 29b. The objective 26 moves back and forth parallel to the disk surface, as indicated by the double headed arrow 33, in response to bidirectional current flow through the moving coil 29a.

The focus control actuator 30 is also shown as a voice coil actuator comprising a moving coil 30a coupled to the objective 26, and a permanent magnet 30b. The objective 26 moves back and forth perpendicular to the disk surface, as indicated by the double headed arrow 34, in response to bidirectional current flow through the moving coil 30a. The beams will thus be kept focused on the disk surface.

The noted two photodetector sections E and F are connected to a tracking servo circuit 17 and thence to the moving coil 29a of the tracking control actuator 29. The tracking servo circuit 17 comprises a subtracter 38, a switch 39 and a phase compensator and driver circuit 40. The subtracter 38 subtracts the output from the photodetector section F from the output from the photodetector section E. The resulting output from the subtracter 38 is a tracking control signal, which is applied via the switch 39 and phase compensator and driver circuit 40 to the moving coil 29a of the tracking control actuator 29, thereby causing the objective 26 to move parallel to the disk surface to keep the read beam spot 35 in centerline alignment with the disk track 21.

The switch 39 is turned on and off by a signal supplied from the system controller 14, FIG. 1, over a line 41. The phase compensator and driver circuit 40 includes phase compensation filter means and gain control means, both not shown, which are controlled by a signal fed from the system controller 14 over a line 41a.

The tracking control actuator 29 serves the additional purpose of jumping the beams to the destination track turn during seek operations. Such beam jumping will take place as a jumping signal is applied from the system controller 14 to the drive section of the phase compensator and driver circuit 40.

The above described method of obtaining the tracking control signal from the photodetector sections E and F is familiar to the specialists as the three spots method. Other known methods could of course be employed, such as the differential phase detection method, which does not require the diffraction grating 22a or the photodetector sections E and F.

The other four photodetector sections A–D are all connected to a focus servo circuit 18 and thence to the moving coil 30a of the focus control actuator 30. The focus servo circuit 18 comprises two adders 42 and 43, a subtracter 44, a switch 45, and a phase compensator and driver circuit 46. The adder 42 adds the outputs from the photodetector sections A and C, and the other adder 43 the outputs from the photodetector sections B and D. The subtracter 44 subtracts the output from the adder 43 from the output from the adder 42. The resulting output from the subtracter 44 is a focus control signal which is applied via the switch 45 and phase compensator and driver circuit 46 to the coil 30a of the focus control actuator 30. The objective 26 will thus be moved toward or away from the disk surface to keep the beams focused thereon.

This focus control method is known to the specialists as the astigmatic method. The switch 45 is operated by a signal supplied from the system controller 14 over a line 47, and the phase compensator and driver circuit 46 by a signal supplied from the system controller over a line 47a.

It is apparent, then, that the addition of all the outputs from the photodetector sections A–D provides a read signal representative of the data read out from the disk 4. In the illustrated embodiment a two inputs adder 48 is provided for adding together the outputs from the two adders 42 and 43 of the focus servo circuit 18. The read signal thus obtained is sent over a line 49 to a wave shaping circuit 9, FIG. 1. In FIG. 2 all or some of the adders 42, 43, and 48 and subtracters 38 and 44 could be parts of the transducer 6.

With reference back to FIG. 1 the transducer 6 is moved radially of the disk 4 by feed means 7 typically comprising an electric motor and means such as a lead screw or a rack and pinion mechanism for translating the bidirectional rotation of the motor into the linear reciprocation of the transducer 6. The feed means 7 have two functions: (1) to move the transducer 6 to the destination track turn on the disk 4 in response to a seek command fed from the system controller 14 over a line 50; and (2) to enable the transducer to trace the spiral track on the disk in cooperation with the disk drive motor 5. For this latter function the feed means 7 detects the radial displacement of the beam spot 35 from the track 21 by directing into a low pass filter, not shown, the tracking control signal fed from the tracking servo circuit 17 over a line 51, and controls the radial travel of the transducer 6 accordingly.

The wave shaping circuit 9 amplifies the radio frequency read signal from the transducer 6 and reshapes it into a binary signal. It is understood that the disk 4 carries data encoded by the well known eight to fourteen modulation (EFM) method. The output from the wave shaping circuit 9 is therefore an EFM signal if the data is read correctly from the disk.

The read output line 49 of the transducer 6 is shown to have connected thereto a line 52 leading to the system controller 14. The line 52 is to inform the system controller 14 whether a disk is loaded in the CD-ROM drive 2 or not. The read output from the transducer 6, or the reflected beam 31, FIG. 2, is eloquently indicative of the presence or absence of a disk in position in the drive.

The wave shaping circuit 9 is connected to both a synchronization detector and demodulator circuit 10 and a phase locked loop (PLL) circuit 11. The PLL circuit 11 provides clock pulses in synchronism with the bits of the EFM signal from the wave shaping circuit 9. The clock pulses put out by the PLL circuit 11 will be hereinafter referred to as the read clock pulses. The PLL circuit 11 has another input connected to the system controller 14 for changing the central frequency of a voltage controlled oscillator, not shown, included in the PLL circuit.

The PLL circuit 11 has its output connected to the synchronization detector and demodulator circuit 10, which operates to determine whether the PLL circuit is locked, that is, whether it is operating in synchronism with the EFM signal. If it is, then, the circuit 10 will pass the read clock pulses from the PLL circuit 11 on to a disk drive motor servo circuit 8 by way of a line 53. Also, when the PLL circuit 11 is found locked, the synchronization detector and demodulator circuit 10 will use the read clock pulses to demodulate the EFM signal into, for example, a digital non-return-to-zero (NRZ) signal, for delivery to an error detector and corrector circuit 12 over a line 54. The synchronization detector and demodulator circuit 10 performs the additional function of demodulating the recovered addresses of the data blocks on the disk 4, for delivery to the system controller 14 over a line 55. The system controller conventionally utilizes the addresses for causing the transducer 6 to be positioned over any desired data block on the disk 4.

The error detector and corrector circuit 12 detects errors, if any, in the incoming NRZ signal, corrects them if possible, and causes reading to be retried if correction is impossible. The output of the error detector and corrector circuit 12 is connected to both an interface circuit 13 and the system controller 14. The interface circuit 13 is connected to the host computer 1 by way of the bus 3 and to the system controller 14.

A clock 16 is connected to the system controller 14 by way of a bus 56, to the motor servo circuit 8 by way of a line 57, to the error detector and corrector circuit 12 by way of a line 58. Controlled by the system controller 14, the clock 16 generates clock pulses at either of a predetermined minimum repetition rate, and two, four, eight, and twelve times the minimum repetition rate, for reasons that will become apparent as the description proceeds. The pulses produced by the clock 16 will be referred to as the true clock pulses in contradistinction from the read clock pulses put out by the PLL circuit 11. The true clock pulses are delivered to the motor servo circuit 8 and to the error detector and corrector circuit 12.

The motor servo circuit 8 has connected thereto the synchronization detector and demodulator circuit 10 by way of the read clock pulse line 53, the system controller 14 by way of the bus 56 and a CAV/CLV control line 60, the clock 16 by way of the line 57, and a motor speed sensor 75 by way of a line 59. The output line 61 of the motor servo circuit 80 is connected to the disk drive motor 5.

Mechanically coupled to the disk drive motor 5, the motor speed sensor 75 generates pulses at a rate proportional to the rotational speed of the motor, as well as of the disk 4. Six motor speed pulses are generated with each motor rotation in this particular embodiment.

Figure 3:
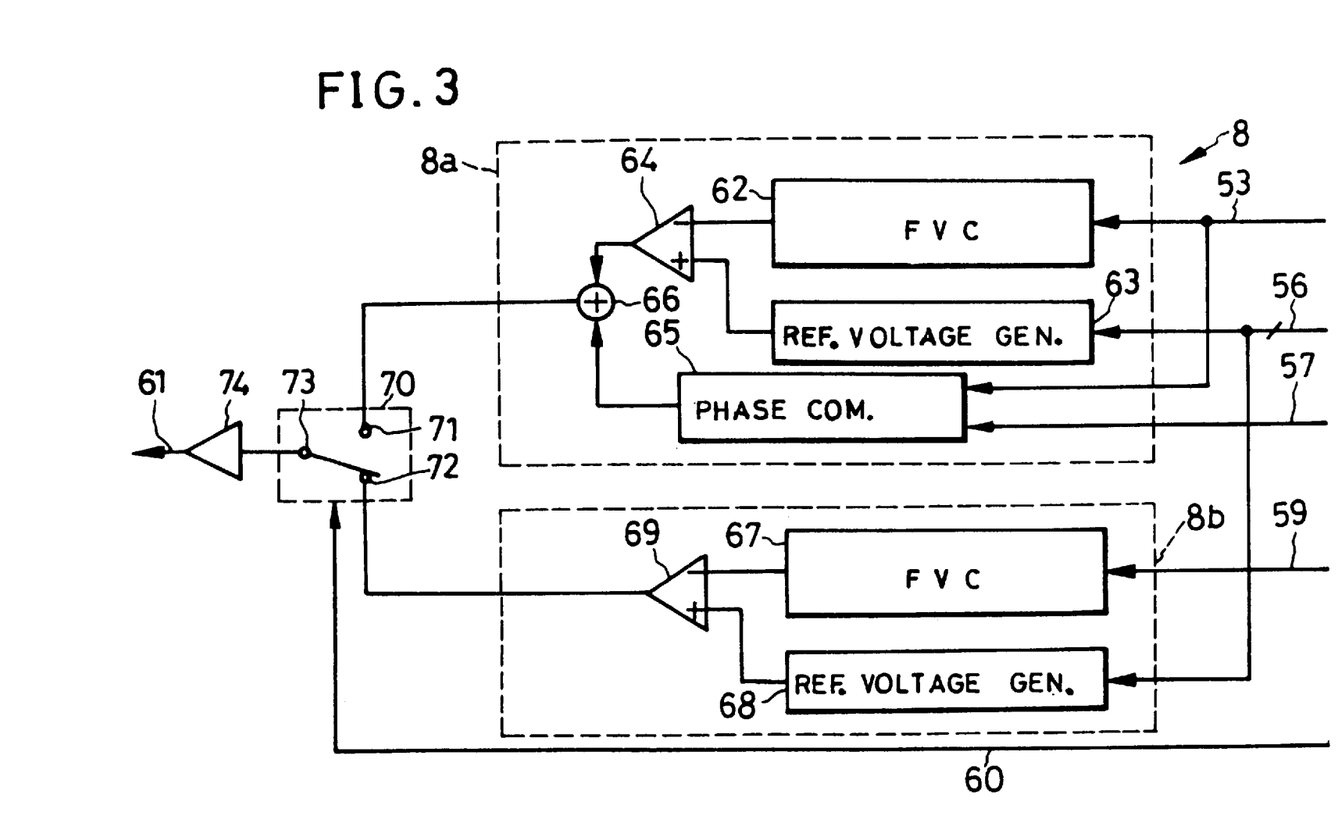
FIG. 3 is a schematic electrical diagram showing in more detail the disk drive motor servo circuit included in the FIG. 1 CD-ROM drive.

As illustrated in detail in FIG. 3, the motor servo circuit 8 comprises a CLV servo circuit 8a for CLV control of the motor 5, and a CAV servo circuit 8b for constant angular velocity control of the motor. The CLV servo circuit 8a includes a frequency to voltage converter (FVC) 62 having an input connected to the read clock pulse line 53 for converting the repetition rate of the read clock pulses into an equivalent voltage signal. The output of the FVC 62 is connected to one input of a differential amplifier 64.

Connected to another input of the differential amplifier 64 is a reference voltage generator 63 which puts out a selected one of five different reference voltages corresponding to a predetermined minimum disk rotation speed, which in this particular embodiment is a standard audio CD speed, and two, four, eight, and twelve times the minimum speed, in response to the speed data sent from the system controller 14 by way of the bus 56. Thus the differential amplifier 64 puts out a repetition rate error signal which is a voltage signal indicative of the difference between the selected reference voltage and the FVC output voltage representative of the read clock pulse rate.

A further member of the CLV servo circuit 8a is a phase comparator 65 having an input connected to the read clock pulse line 53, and another input to the true clock pulse line 57. The output from the phase comparator 65 is therefore a phase error signal indicative of the phase departure of the read clock pulses from the true clock pulses.

The differential amplifier 64 and the phase comparator 65 are both connected to an adder 66, an additional component of the CLV circuit 8a. The output from the adder 66 is the sum of the repetition rate error signal and the phase error signal. This output from the adder 66 is therefore termed a total error signal.

The CAV servo circuit 8b has an FVC 67 and a reference voltage generator 68, both connected to the inputs of a differential amplifier 69. Connected to the output line 59 of the motor speed sensor 75, the FVC 67 provides a voltage proportional to the repetition rate of the motor speed pulses, that if, to the rotational speed of the disk drive motor 5. Like its counterpart in the CLV servo circuit 8a, the reference voltage generator 63 has its input connected to the speed data bus 56 for putting out a reference voltage representative of the speed specified by the system controller 14. The differential amplifier 69 provides a voltage corresponding to the difference between the outputs from the FVC 67 and the reference voltage generator 68.

The motor servo circuit 8 is further provided with a selector switch 70 for selectively putting out the CLV and the CAV control signals produced by the circuits 8a and 8b. The selector switch 70 is shown to comprise a fixed contact 71 connected to the adder 66, another fixed contact connected to the differential amplifier 69, and a movable contact 73 connected to a drive amplifier 74 and thence to the disk drive motor 5, FIG. 1, by way of a line 61. The movable contact 73 is engageable with either of the two fixed contacts 71 and 72 under the direction of a CAV/CLV select signal sent from the system controller 14 over the line 60.

At 15 in FIG. 1 are shown means for sensing the wobbling of the disk 4 in terms of the resulting vibration of the CD-ROM drive 2. The vibration sensing means 15 comprise a piezoelectric vibration sensor 76, a low pass filter (LPF) 77 for suppression of high frequency noise that may be included in the output from the vibration sensor, and an analog to digital converter (ADC) 78 for digitizing the output from the LPF. The vibration sensor 76 is so mounted to a stationary part 76a of the CD-ROM drive 2 mechanically supporting, either directly or indirectly, the disk drive motor 5 as to be capable of sensing vibration normal to the plane of the disk 4 in particular. However, since CD-ROM drive vibration due to disk wobbling takes place not only in that direction but also parallel to the disk plane, the vibration sensor 76 may be so disposed as to sense vibration in the second mentioned direction. Generally, CD-ROM drive vibration from disk rotation can be sensed in terms of either displacement or acceleration, the latter being relied upon in this particular embodiment.

Connected to the output of the vibration sensor 76, the LPF 77 serves to extract only those frequency components of the vibration sensor output signal which are due to disk wobbling. The rotational speed of the disk is increased with time in determining the maximum allowable speed for each loaded disk according to the present invention, as will be detailed subsequently, so that the vibration of the fixed part 76a due to disk wobbling is subject to change in frequency with the speed of disk rotation. The cutoff frequency of the LPF 77 is therefore varied with time in response to a signal sent from the system controller 14 over a line 79. The ADC digitizes the output from the LPF 77 preparatory to delivery to the system controller 14 over a line 80.

The system controller 14 can take the form of a programmable microprocessor of conventional design comprising a central processor unit (CPU) 81, a random access memory 82, and a ROM 83 storing programs and tables. The programs on the ROM 83 include a wobble check program according to the present invention, which dictates a sequence of steps to be followed for determining a maximum allowable speed for each loaded disk according to the degree of its wobbling, as will be detailed presently. The stored tables include those for use In the execution of the wobble check program, as will also be referred to in more detail subsequently.

Figure 4:
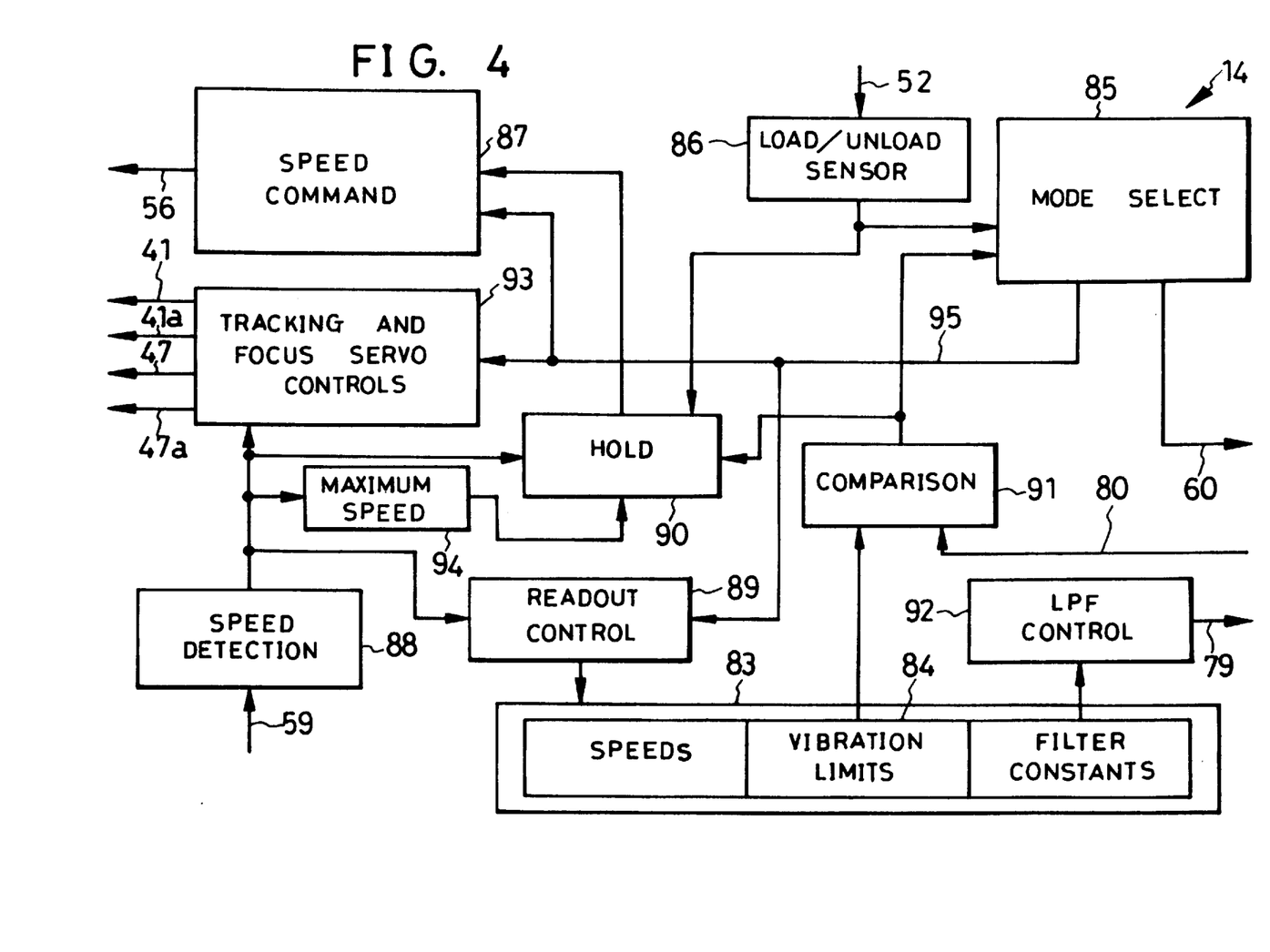
FIG. 4 is an equivalent block diagram of the system controller included in the FIG. 1 CD-ROM drive, particularly in regard to the implementation of the wobble check program according to the invention.

FIG. 4 is a block diagram of some of the means that may be considered included in the system controller 14 for performing the wobble check program according to the invention. The ROM 83 stores tables 84 listing the maximum allowable vibrations of the CD-ROM drive 2 and the filter constants of the LPF 77 at various predetermined disk rotational speeds at, say, 100 rpm intervals. For reading out the stored data there are provided a speed detecting means 88 and a ROM reading means 89. As the speed detecting means 88, connected to the motor speed sensor output line 59, detects the predetermined disk rotational speeds of, say, 100 rpm, 200 rpm, 300 rpm, and so forth, the ROM reading means 89 will cause the maximum allowable vibrations and filter constants at these predetermined speeds to be read out from the ROM 83. The speed detecting means 88 detects the predetermined speeds by counting the incoming motor speed pulses.

A mode select means 85 selects between read mode and wobble check mode, in which latter mode the noted wobble check program is to be executed upon loading of each disk into the CD-ROM drive 2. In response to a signal from a disk load/unload sensing means 86 indicating the loading of a disk 4, the mode select means 85 will put out a signal suggesting the start of the wobble check mode. The disk load/unload sensing means 86 is connected to the transducer 6, FIG. 1, by way of the line 52 for ascertaining the presence or absence of the disk 4 on the basis of the output from the transducer.

The mode select signal from the mode select means 85 will be sent over a line 95 to a speed command means 87, a tracking and focus servo control means 93, and a ROM reading means 89. The speed command means 87 will provide disk speed data suggestive of gradual motor speed increase from the minimum to the maximum of 12 times the minimum when the mode select signal indicates the wobble check mode, and data suggestive of the maximum allowable speed determined, or a speed less than that, when the mode select signal indicates the read mode.

The tracking and focus servo control means 93 will deliver over the lines 41 and 47 the signals for turning off the tracking switch 39 and focus switch 45, both shown in FIG. 2, when the mode select signal indicates the wobble check mode, and for turning on the switches 39 and 45 only during those periods when the mode select signal indicates the read mode and, at the same time, when tracking and focus controls are required. Also, in the read mode, the tracking and focus servo control means 93 will send over the lines 41a and 47a the signals for varying the filter constants and gains of the phase compensator and driver circuits 40 and 46, both FIG. 2, of the tracking and focus servo circuits 17 and 18, in response to the output from the speed detecting means 88.

Another function of the mode select means 85 is to supply the CAV/CLV select signal to the selector switch 70, FIG. 3, of the motor servo circuit 8 over the line 60. The CAV/CLV select signal will indicate CAV driving of the disk drive motor 5, causing the movable contact 73 of the switch 70 to engage the fixed contact 72, during wobble check operation, and CLV driving of the motor 5, causing the movable contact 72 to engage the other fixed contact 71, during read mode operation.

When the mode select signal on the line 95 indicates the wobble check mode, the ROM reading means 89 will cause the maximum allowable vibration values and filter constants to be successively read out from the ROM tables 84 at the aforesaid predetermined disk speeds of 100 rpm intervals. The maximum allowable vibration data will be directed into a comparison means 91, which will compare at each predetermined disk speed the maximum allowable vibration value with the detected actual vibration value being supplied at that time from the vibration sensing means 15, FIG. 1, over the line 80. When they agree, the comparison means 91 will put out a signal indicating that the disk is being driven at a maximum allowable speed, for delivery to both holding means 90 and mode select means 85.

The maximum allowable vibration values stored on the ROM 83 do not increase with the predetermined disk speeds so much as the detected actual vibration on the line 80 usually does. Therefore, if the loaded disk is more or less eccentric or has a more or less uneven weight distribution circumferentially, the resulting vibration of the fixed part 76a will reach a maximum allowable limit at one of the predetermined disk speeds depending upon the degree of eccentricity or the degree of unevenness of weight distribution. When the comparison means signals that the actual vibration caused by the rotating disk has reached a predetermined allowable limit at any of the predetermined disk speeds, the holding means 90 will hold the output being supplied at that time from the disk speed detecting means 88, as a maximum allowable speed for that particular disk.

If the loaded disk is of good quality, on the other hand, then the vibration caused by that disk may not build up to the allowable limit even when the disk is driven at the predetermined maximum speed. The holding means 90 will hold this predetermined maximum speed as the maximum allowable speed when a maximum speed judging means 94, connected to the speed detecting means 88, judges that the disk is being driven at that predetermined maximum speed and, at the same time, when the comparison means 91 signals that the detected actual vibration is nevertheless not up to the allowable limit at that speed.

The maximum allowable speed that has been determined and held as above on the holding means 90 will be supplied to the speed command means 87. During subsequent reading, the speed command means 87 will put out speed data indicative of the maximum allowable speed supplied form the holding means 90. Optionally, when the maximum allowable speed is determined as above, the speed data generator means 87 may be caused to provide speed data indicative of a speed somewhat less than the maximum allowable speed. The holding means 90 will hold the maximum allowable speed until the disk load/unload sensing means 86 signals that the disk 4 has been unloaded.

At 92 in FIG. 4 is shown an LPF control means connected between ROM 83 and LPF 77, FIG. 1, of the vibration sensor means 15. The LPF control means 92 functions to vary the filter constant of the LPF 77 according to the value read out from the ROM 83 at each predetermined disk speed.

Figure 5:
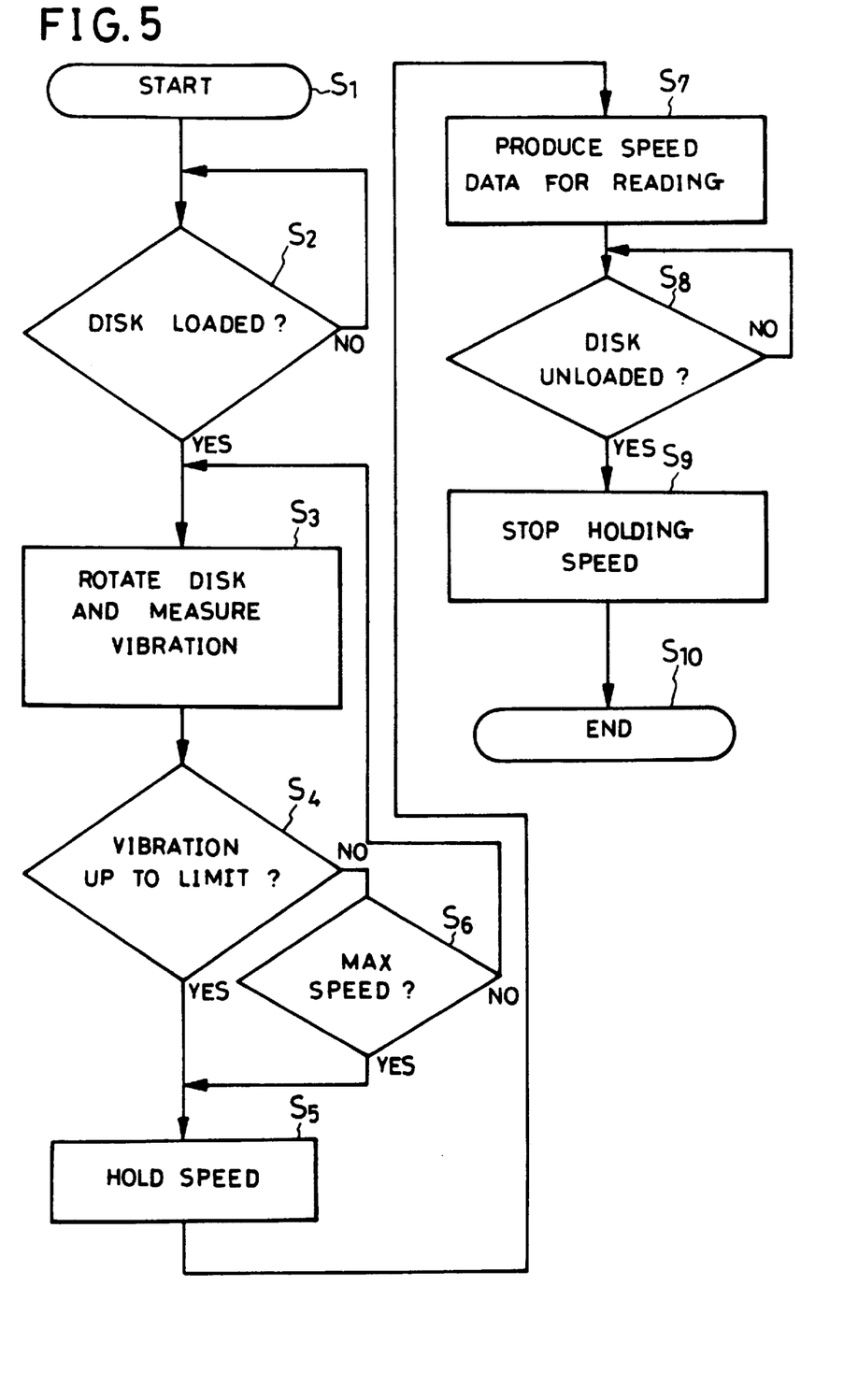
FIG. 5 is a flow chart of the wobble check program introduced into the FIG. 4 system controller.

Reference is now directed to the flowchart of FIG. 5 for a discussion of the wobble check program stored on the ROM 83 of the system controller 14. Following the start of the program at $S_1$, it is judged at a logical node $S_2$ whether a disk has been loaded in position on the spindle 19 or not. If it is, then the disk is set into rotation at block $S_3$, with the speed of disk rotation gradually increased from the predetermined minimum to the maximum of twelve times the minimum. Further, at this block $S_3$, the possible vibration of the CD-ROM drive part 76a due to the possible wobbling of the disk is constantly measured at increasing disk speed.

Next comes another node $S_4$ which asks if the measured vibration comes up to a predetermined allowable limit at each of the disk speeds that have been predetermined at 100 rpm intervals. If it does not, it is asked at yet another node $S_6$ whether the current disk speed is the predetermined maximum or not. Assume that the answer to this question is now "no." Then the block $S_3$ is again taken up to continue driving the disk at increasing speed, and vibration measurement is continued. The measured vibration, which will usually increase with increasing disk speed, is compared at the node $S_4$ with the successive predetermined allowable limits at the predetermined increasing disk speeds.

If the measured vibration is found up to a predetermined allowable limit at any of these predetermined disk speeds, the program proceeds from node $S_4$ to block $S_5$, where the actual disk speed at that time is held as the maximum allowable speed for that disk. If the measured vibration does not come up to the predetermined allowable limit even when the disk speed is increased to the predetermined maximum, that is, if the answer to the node $S_6$ becomes finally "yes," then the predetermined maximum speed is held as the maximum allowable speed for the disk at block $S_5$.

Then, at block $S_7$, the speed data for reading the disk is produced which represents either the maximum allowable speed held at block $S_5$ or a speed less than that.

A further node $S_8$ is then encountered which asks if the disk is unloaded or still loaded. When the disk is unloaded, the maximum allowable speed that has been held at block $S_5$ is called off at block $S_9$, that speed being effective for that disk only. The program comes to an end at $S_{10}$, and is to be restarted whenever a disk is loaded subsequently.

Second Form

Figure 6:
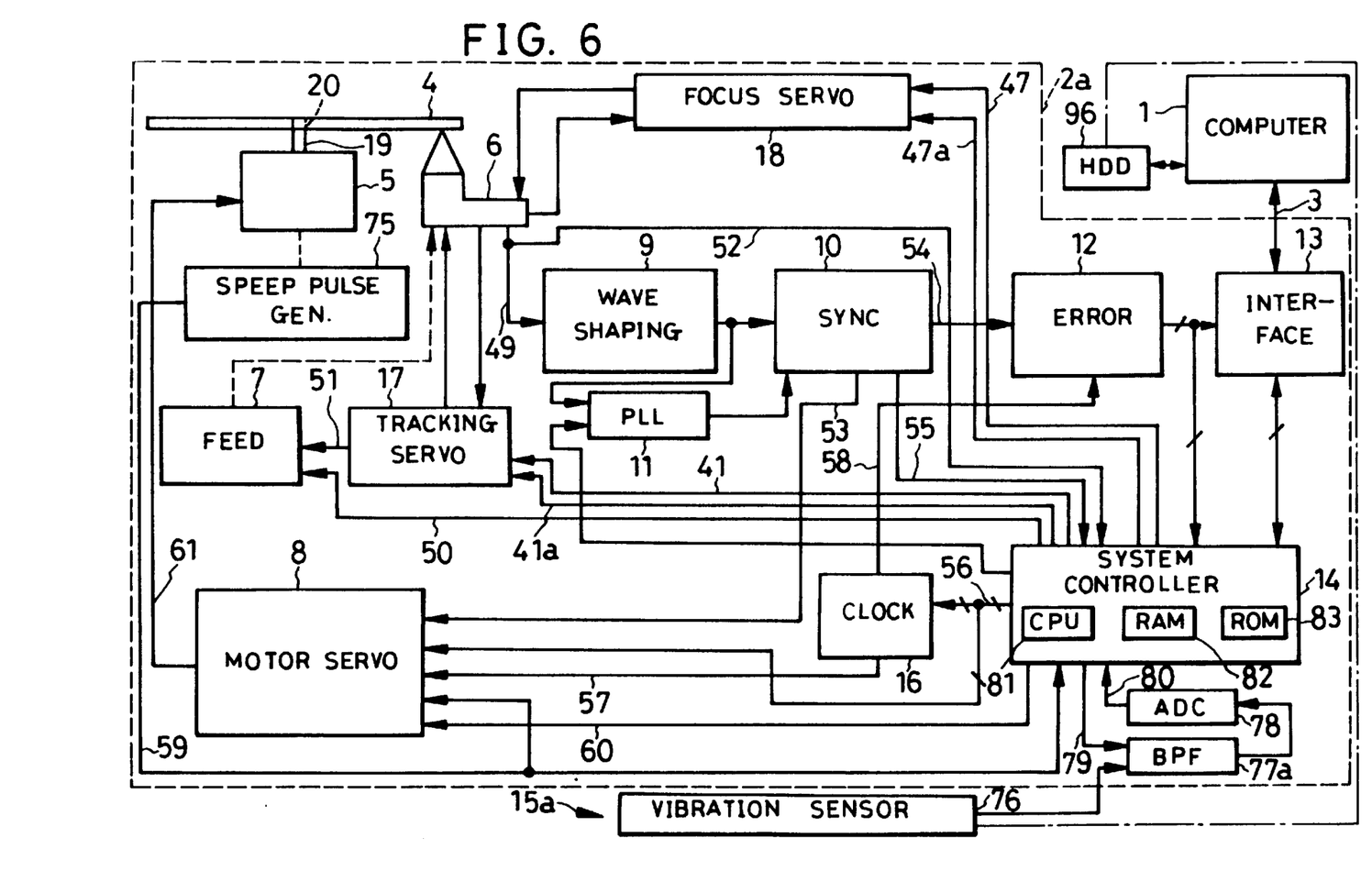
FIG. 6 is a diagram similar to FIG. 1 but showing another example of CD-ROM drive according to the invention.

FIG. 6 shows a modified CD-ROM drive 2a according to the present invention, which is similar in construction to the FIG. 1 device 2 except for the vibration sensor means.

Generally designated 15a, the vibration sensor means of this alternate embodiment differ from the FIG. 1 counterpart 15 in having the vibration sensor 76 disposed external to the CD-ROM drive 2a and in having a bandpass filter (BPF) 77a in place of the LPF 77. The drives 2 and 2a are alike in all the other details of construction, and like reference characters are used to denote like parts in both FIGS. 1 and 6.

Figure 7:
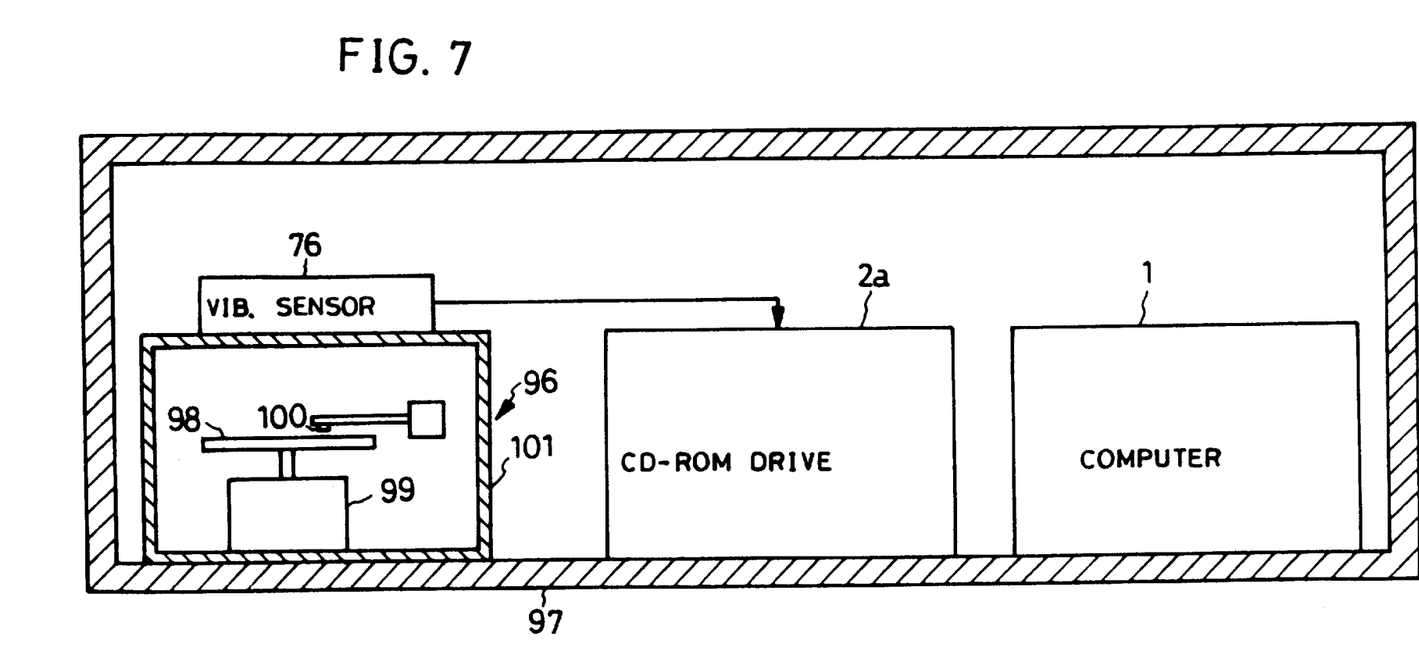
FIG. 7 shows, partly in section and partly in block diagrammatic form, the computer system including the FIG. 6 CD-ROM drive, the view being explanatory in particular of the location of a vibration sensor which is essential in the practice of the invention.

As pictured in FIG. 7, the vibration sensor 76 is mounted to the enclosure 101 of an HDD 96 which, together with the CD-ROM drive 2a is mounted within the same casing 97 as the computer 1 as an external memory of that computer. The HDD 96 is of conventional make comprising a hard magnetic disk 98 driven by an electric motor 99, and a flying head 100 for data transfer with the disk.

The vibration of the CD-ROM drive 2a, caused by the wobbling of the CD-ROM loaded therein, is almost directly transmitted to the HDD 96. The vibration of the HDD is no less, or even more, undesirable than that of the CD-ROM drive because the flying head 100 is easy to collide with the disk 98 with the consequent destruction of either or both. The vibration sensor 76 is therefore mounted to the HDD enclosure 101. Besides being used for the determination of an allowable maximum speed for each disk loaded in the CD-ROM drive 2a, the vibration sensor 76 is used for causing the HDD 96 to discontinue reading or writing when its vibration grows to a predetermined limit.

Figure 8:
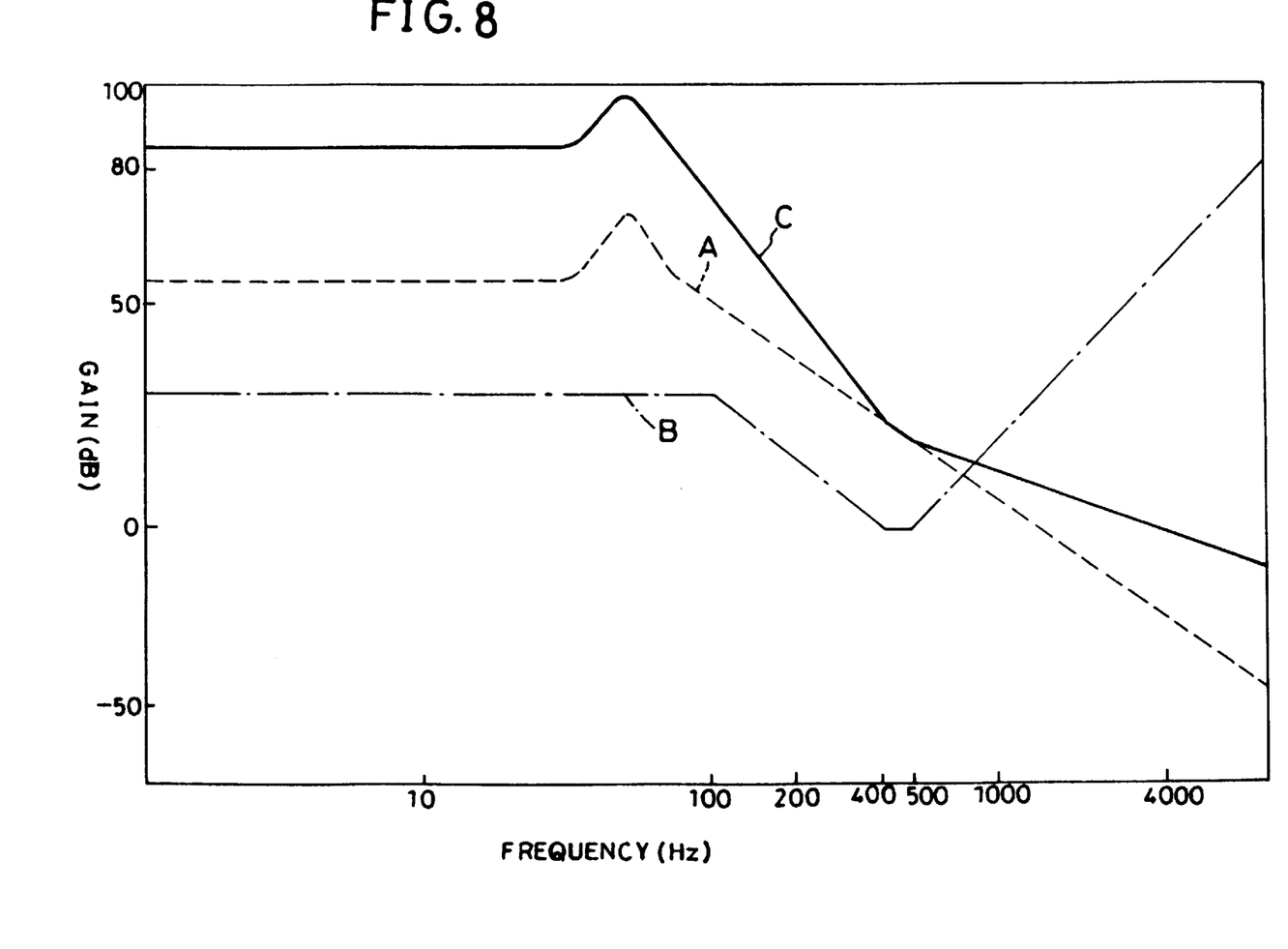
FIG. 8 is a graph plotting the frequency characteristics of the tracking servo circuit included in the FIG. 6 CD-ROM drive.

The BPF 77a is so made as to to pass a band of frequencies at which vibration is particularly harmful to the proper functionings of the tracking servo circuit 17 and the focus servo circuit 18. In the graph of FIG. 8 the curve A represents the gain of the tracking servo circuit 17 at various frequencies before compensation by the filter included in the phase compensator and driver circuit 40, FIG. 2. The curve B represents the gain of the compensator filter. The curve C represents the gain of the tracking servo circuit 17 after compensation. From the curve C the tracking servo circuit 17 can be considered weak to vibration in the frequency band of 200 to 1000 Hz.

Figure 9:
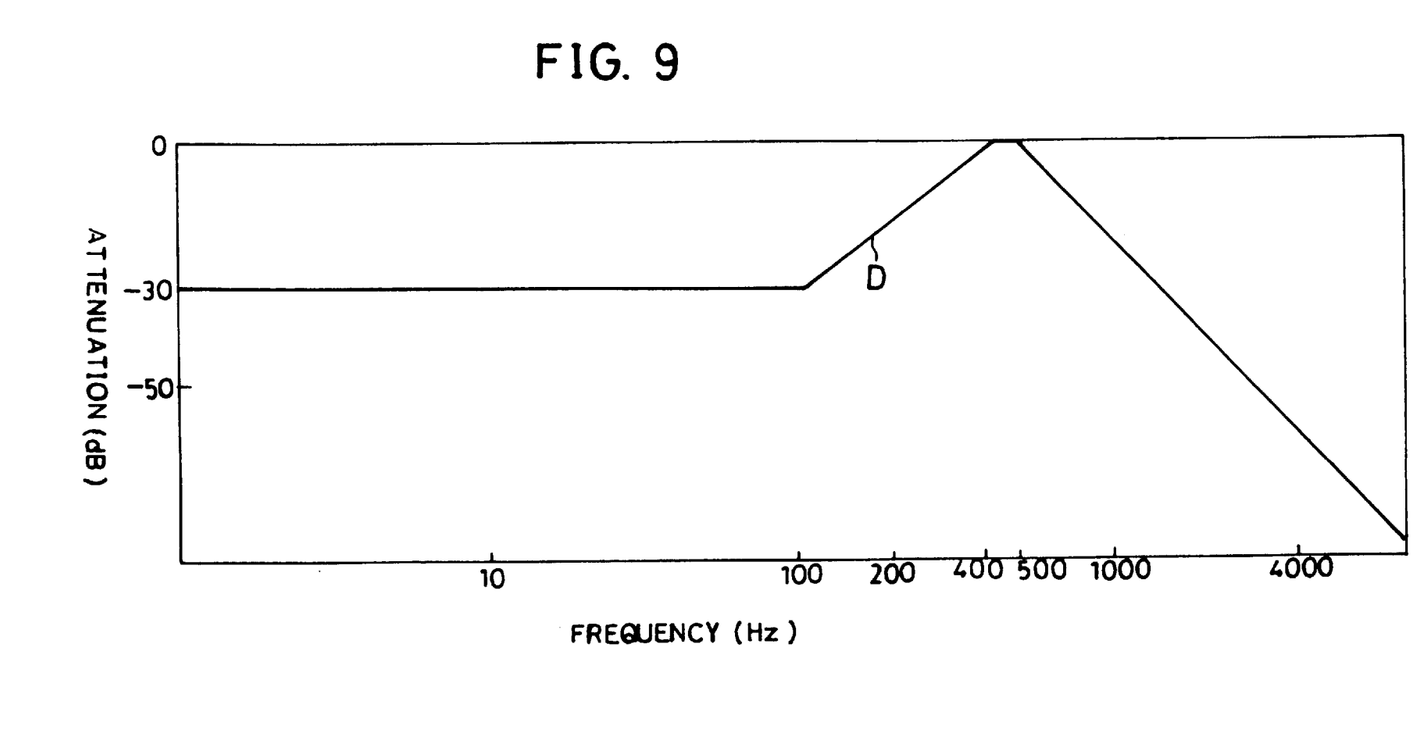
FIG. 9 is a graph plotting the frequency characteristic of the band pass filter included in the FIG. 6 CD-ROM drive.

Therefore, as indicated by the curve D in FIG. 9, the passband of the BPF 77a is set from 200 Hz to 1000 Hz. It will thus be understood that the BPF 77a functions to extract that vibration component from the incoming vibration sensor output which is particularly harmful to tracking and focus controls, the frequency characteristic of the focus servo circuit 18 being essentially equivalent to that of the tracking servo circuit 17. Inputting the thus detected vibration of the CD-ROM drive 2a, or of the HDD 96, via the ADC 78, the system controller 14 utilizes it as in the first disclosed embodiment for determination of an optimum drive speed for each loaded disk. It is understood that during wobble check operation, the passband of the BPF 77a is modified according to the speed of disk rotation under the direction of the system controller 14, just like the cutoff frequency of the LPF 77 of the FIG. 1 CD-ROM drive 2.

This second embodiment gains the advantage, in addition to those obtained by the first, that the HDD is effectively protected from destruction or malfunctioning. Further the BPF 77a contributes toward more accurate detection of harmful vibration and, in consequence, more trouble-free operation of the CD-ROM drive.

Third Form

Figure 10:
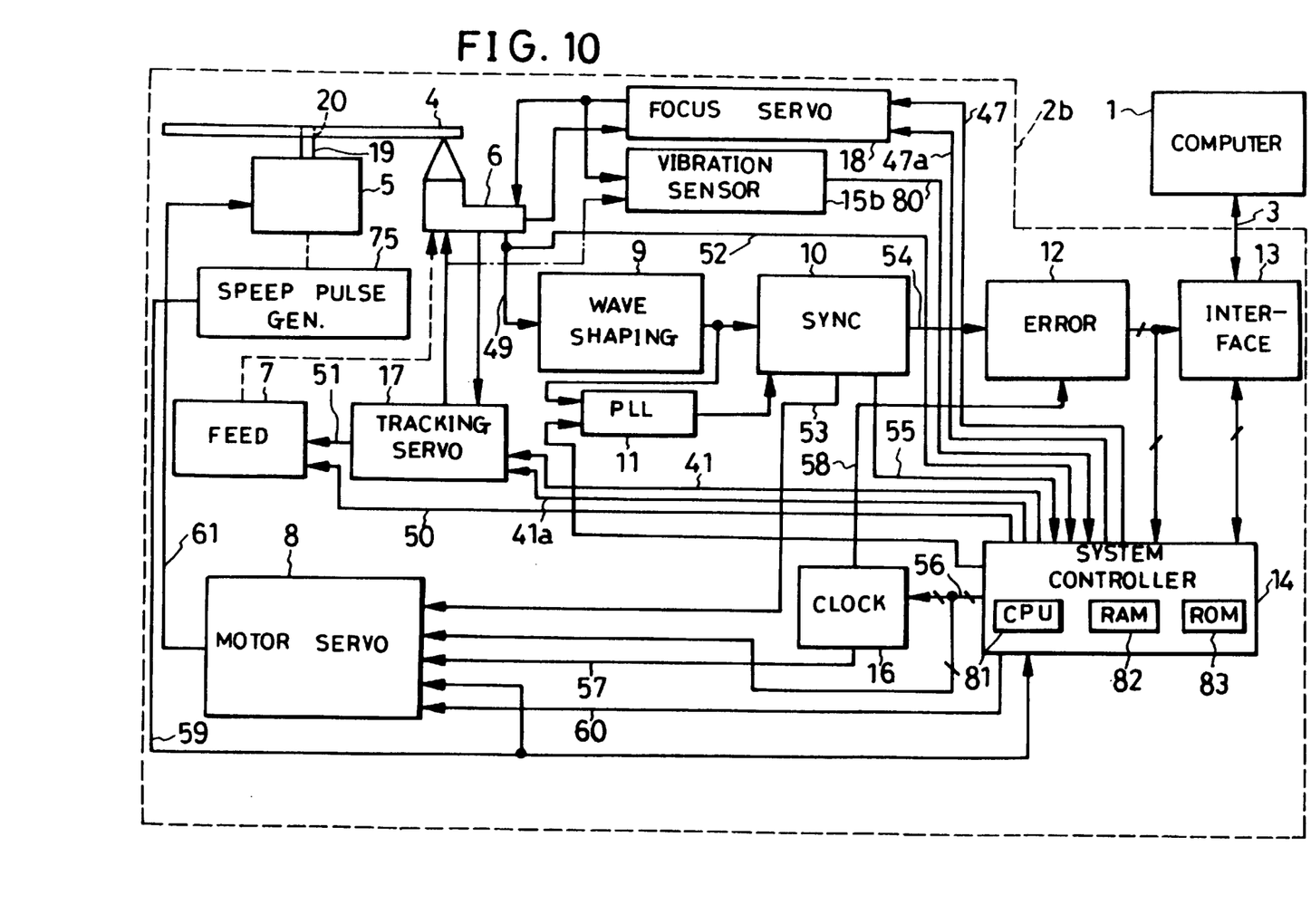
FIG. 10 is a diagram similar to FIG. 1 but showing still another example of CD-ROM drive according to the invention.

Another modified CR-ROM drive 2b in FIG. 10 differs from the FIG. 1 device 2 only in having a vibration sensor circuit 15b in substitution for the vibration sensor means 15. The vibration sensor circuit 15b is connected to the output of the focus servo circuit 18 or, more specifically, to the moving coil 30a, FIG. 2, of the focus control actuator 30, although the vibration sensor circuit could be connected to the output line of the tracking servo circuit 17, as indicated by the dot and dash line in FIG. 10. The output of the vibration sensor circuit 15b is connected to the system controller 14 by way of the line 80.

Figure 11:
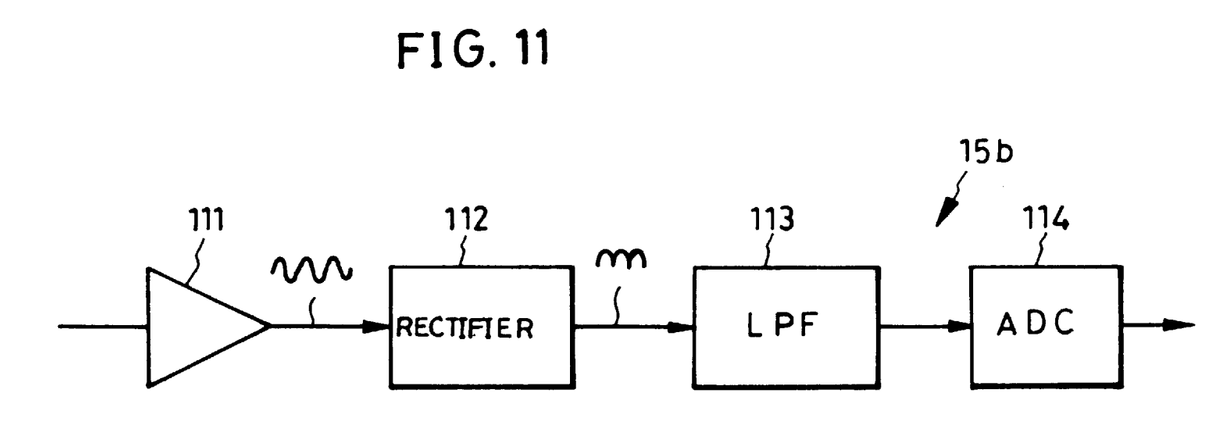
FIG. 11 is a block diagram of the vibration sensor circuit included in the FIG. 10 CD-ROM drive.

As illustrated block diagrammatically in FIG. 11, the vibration sensor circuit 15b is a serial connection of a buffer amplifier 111, a rectifier circuit 112, an LPF 113 as smoothing or integrating circuit, and an ADC 114.

As has been set forth in connection with the first disclosed CD-ROM drive 2, the tracking switche 39 and focus switch 45, both shown in FIG. 2, are held off during operation in wobble check mode, so that the tracking servo circuit 17 and focus servo circuit 18 are substantially electrically disconnected from the moving coils 29a and 30a, respectively. Further, since the moving coils 29a and 30a are disposed in the fields of the permanent magnets 29b and 30b, voltages will develop in these coils with their motions relative to the magnets upon vibration of the CD-ROM drive 2b due to disk wobbling. The vibration sensor circuit 15b is intended to sense the vibration in terms the voltage thus induced in either of the coils 29a and 30a. The thus sensed vibration can be utilized as in the foregoing embodiments to determine a wobble-free driving speed for each loaded disk.

A particular advantage gained by the CD-ROM drive 2b is the cheapness of the vibration sensor circuit 15b compared with its counterparts in the two foregoing embodiments.

Possible Modifications

Notwithstanding the foregoing detailed disclosure it is not desired that the present invention be limited by the exact showing of the drawings or the description thereof; rather, the invention should be construed broadly and in a manner consistent with the fair meaning or proper scope of the attached claims. The following is a brief list of possible modifications of the illustrated embodiments which are all believed to fall within the scope of the invention:

1. The disk speed could be increased stepwise, instead of continuously, as at a minimum, and two, four, eight and twelve times the minimum, and the detected actual vibration could be compared with a predetermined allowable limit at each such speed.

2. Disk wobbling could be detected in terms of the vibration of the disk itself, of the disk drive motor, or of any other part of the CD-ROM drive or the computer system, instead of from that of the part 76a mechanically supporting the motor.

3. The CAV servo circuit 8 b, FIG. 3, could be omitted, as the CLV servo circuit 8a enabled the execution of the wobble check program by scanning the inmost track turn of the disk for providing the disk speeds of the minimum, and two, four, eight and twelve times the minimum.

4. The speed detecting means 88, disk load/unload sensing means 86 and ROM 83 could be external to the system controller 14.

5. The invention could be applied not only to optical disk but also magnetic disk drives, as well as to devices for CAV servo reading of CAV disks, CAV reading of CLV disks, and combined CAV and CLV reading of CLV disks.

What is claimed is:

1. A method of data recovery from rotating data storage disks of varying physical qualities which may wobble during rotation, the method comprising:

(a) rotating a data storage disk at increasing speed preparatory to data recovery therefrom;

(b) concurrently with step (a), sensing the possible wobbling of the rotating data storage disk;

(c) ascertaining if the wobbling of the disk has built up to a predetermined limit;

(d) holding as a maximum allowable speed the rotational speed of the disk at which the disk wobbled to the predetermined limit; or (e) instead of step (d), holding as a maximum allowable speed a predetermined maximum speed of disk rotation in the case where the disk does not wobble to the predetermined limit even when rotated at the predetermined maximum speed; and (f) in data recovery, rotating the disk at a speed not exceeding the maximum allowable speed that has been determined for the disk at step (d) or (e);

(g) whereby the disk is not to wobble beyond the predetermined limit during data recovery therefrom.

2. The method of claim 1 wherein the disk is rotated at increasing speed automatically when the disk is loaded in an apparatus for driving the disk, and wherein the maximum allowable speed for the disk is held until the disk is unloaded from the apparatus.

3. The method of claim 1 wherein the possible wobbling of the rotating data storage disk is sensed in terms of the resulting mechanical vibration of a selected part of a computer system including an apparatus for driving the disk.

4. The method of claim 1 wherein the possible wobbling of the rotating data storage disk is sensed electrically in terms of a voltage induced in a moving coil upon displacement thereof relative to a permanent magnet due to disk wobbling, both moving coil and permanent magnet being preexistent in a device for driving the disk.

5. A method of data recovery from rotating data storage disks of varying physical qualities which may wobble during rotation, the method comprising:

(a) predetermining a series of limits of allowable disk wobbling at a series of predetermined speeds of disk rotation;

(b) rotating a data storage disk at increasing speed preparatory to data recovery therefrom;

(c) concurrently with step (b), sensing the possible wobbling of the data storage disk rotating at increasing speed;

(d) ascertaining, at each predetermined speed of disk rotation, if the wobbling of the disk builds up to the predetermined limit at that predetermined speed;

(e) holding as a maximum allowable speed the rotational speed of the disk at the time the disk is found to wobble to the predetermined limit at any predetermined speed; or (f) instead of step (e), holding as a maximum allowable speed a predetermined maximum speed of disk rotation in the case where the disk is found not to wobble to the predetermined limit at the predetermined maximum speed; and (g) in data recovery, rotating the disk at a speed not exceeding the maximum allowable speed that has been determined for the disk at step (e) or (f);

(h) whereby the disk is not to wobble beyond the predetermined limit at one of the predetermined speeds during data recovery therefrom.

6. An apparatus for data recovery from rotating data storage disks of varying physical qualities which may wobble during rotation, wherein the improvement resides in the combination comprising:

(a) drive means for imparting rotation to a data storage disk;

(b) wobbling sensor means for sensing the possible wobbling of the disk;

(c) speed sensor means for sensing the speed of rotation of the disk; and (d) control means connected to the drive means and the wobbling sensor means and the speed sensor means for causing the drive means to rotate each loaded data storage disk at increasing speed preparatory to data recovery therefrom in order to detect the possible wobbling of the disk by the wobbling sensor means and to determine if the wobbling of the disk has built up to a predetermined limit, for holding as a maximum allowable speed either the rotational speed of the disk at which the disk wobbled to the predetermined limit, or a predetermined maximum speed of disk rotation in the case where the disk does not wobble to the predetermined limit even when rotated at the predetermined maximum speed, and, in data recovery, for causing the drive means to rotate the disk at a speed not exceeding the maximum allowable speed;

(e) whereby the disk is not to wobble beyond the predetermined limit during data recovery therefrom.

7. The apparatus of claim 6 wherein the wobbling sensor means comprises a vibration sensor for sensing the mechanical vibration of a selected part of the apparatus due to the wobbling of the disk.

8. The apparatus of claim 6 wherein the apparatus forms a part of a computer system, and wherein the wobbling sensor means comprises a vibration sensor for sensing the mechanical vibration, due to the wobbling of the disk, of a selected part of the computer system.

9. The apparatus of claim 6 wherein the wobbling sensor means comprises:

(a) a vibration sensor for sensing the vibration of a part that is susceptible to vibration upon wobbling of the disk; and (b) a low pass filter connected to the vibration sensor for suppressing high frequency noise that may be contained in the output therefrom.

10. The apparatus of claim 6 wherein the wobbling sensor means comprises:

(a) a vibration sensor for sensing the vibration of a part that is susceptible to vibration upon wobbling of the disk; and (b) a band pass filter connected to the vibration sensor for extracting from the output therefrom a vibration component of a prescribed frequency band that is particularly harmful to the data recovery apparatus.

11. The apparatus of claim 6 wherein the apparatus further includes a transducer for reading the data storage disk by irradiating the same with a beam of light, focus control means including a focus servo circuit for keeping the beam focused on the disk, and tracking control means including a tracking servo circuit for keeping the spot of the beam on the disk in alignment with a track thereon, the focus servo circuit and the tracking servo circuit having each a low gain frequency band and wherein the wobbling sensor means comprises:

(a) a vibration sensor for sensing the vibration of a part that is susceptible to vibration upon wobbling of the disk; and (b) a band pass filter connected an output of the vibration sensor, the bandpass filter having a passband that approximately agrees with the low gain frequency band of the focus or tracking servo circuit.

12. The apparatus of claim 6 wherein the apparatus further includes a transducer for reading the data storage disk by irradiating the same with a beam of light, and focus control means including a focus control actuator for keeping the beam focused on the disk, the focus control actuator having a moving coil movable in the field of a permanent magnet, and wherein the wobbling sensor means comprises:

(a) a wobbling sensor circuit for sensing the wobbling of the rotating data storage disk in terms of a voltage induced in the moving coil of the focus control actuator upon displacement thereof relative to the permanent magnet.

13. The apparatus of claim 6 wherein the apparatus further includes a transducer for reading the data storage disk by irradiating the same with a beam of light, and tracking control means including a tracking control actuator for keeping the spot of the beam on the disk in alignment with a track thereon, the tracking control actuator having a moving coil movable in the field of a permanent magnet, and wherein the wobbling sensor means comprises:

(a) a wobbling sensor circuit for sensing the wobbling of the rotating data storage disk in terms of a voltage induced in the moving coil of the tracking control actuator upon displacement thereof relative to the permanent magnet.

14. An apparatus for data recovery from rotating data storage disks of varying physical qualities which may wobble during rotation, wherein the improvement resides in the combination comprising:

(a) drive means for imparting rotation to a data storage disk;

(b) speed sensor means for sensing the speed of rotation of the disk;

(c) mode select means for providing a mode select signal indicative of wobble check mode or read mode;

(d) speed command means connected between the mode select means and the drive means for causing the disk to be rotated at increasing speed when the mode select signal indicates the wobble check mode;

(e) wobbling sensor means for sensing the possible wobbling of the disk;

(f) comparison means connected to the wobbling sensor means for comparing the wobbling of the disk with a predetermined limit of allowable disk wobbling during wobble check mode operation;

(g) holding means connected to the speed sensor means and the comparison means for holding as a maximum allowable speed either the speed of rotation of the disk at the time the wobbling of the disk is found to reach the predetermined limit by the comparison means, or a predetermined maximum speed of disk rotation if the wobbling of the disk does not reach the predetermined limit even when the disk is rotated at the predetermined maximum speed;

(h) the speed command means being connected to the holding means for causing the disk to be rotated during read mode operation at a speed not exceeding the maximum allowable speed being held by the holding means;

(i) whereby the disk is not to wobble beyond the predetermined limit during data recovery therefrom.

15. The apparatus of claim 14 further comprising:

(a) memory means for storing a table listing a series of predetermined limits of allowable disk wobbling at a series of predetermined speeds of disk rotation;

(b) readout means connected between the speed sensor means and the memory means for causing the predetermined limits of allowable disk wobbling to be read out from the memory means when the disk is being rotated at the predetermined speeds;

(c) the comparison means being connected to the memory means for comparing the wobbling of the disk with the predetermined limits being successively read out from the memory means during wobble check mode operation.

16. The apparatus of claim 15 wherein the wobbling sensor means comprises:

(a) a vibration sensor for sensing the wobbling of the disk in terms of the mechanical vibration of a part that is susceptible to vibration upon wobbling of the disk; and (b) a low pass filter for filtering out high frequency noise from an output from the vibration sensor.

17. The apparatus of claim 16 wherein the memory means stores a table listing a series of predetermined filter constants for the low pass filter at a series of predetermined speeds of disk rotation, the readout means causing the predetermined filter constants to be successively read out from the memory means during wobble check mode operation, thereby causing the filter constant of the low pass filter to be changed accordingly.

18. The apparatus of claim 14 further comprising:

(a) load/unload sensing means for sensing the loading and unloading of a data storage disk into and from the apparatus;

(b) the mode select means being connected to the load/unload sensing means for starting the wobble check mode when a disk is loaded;

(c) the holding means being connected to the load/unload sensing means for holding the maximum allowable speed for each disk until that disk is unloaded.

* * * * *